(12) United States Patent
Argue et al.

(10) Patent No.: US 8,700,474 B2
(45) Date of Patent: Apr. 15, 2014

(54) DELIVERYING CUSTOMER SPECIFIED RECEIPT TYPES AT CHECKOUT

(75) Inventors: Stuart Argue, Palo Alto, CA (US); Anthony Emile Marcar, San Francisco, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/595,889

(22) Filed: Aug. 27, 2012

(65) Prior Publication Data
US 2014/0058869 A1    Feb. 27, 2014

(51) Int. Cl.
*G06Q 10/00* (2012.01)
(52) U.S. Cl.
USPC .......................................................... 705/26
(58) Field of Classification Search
None
See application file for complete search history.

(56) References Cited

U.S. PATENT DOCUMENTS

| | | | |
|---|---|---|---|
| 7,725,369 B2 | 5/2010 | Shiftan | |
| 7,827,077 B2 | 11/2010 | Shiftan | |
| 8,160,217 B2 | 4/2012 | New | |
| 8,219,489 B2 | 7/2012 | Patterson | |
| 2005/0073710 A1* | 4/2005 | Campbell et al. | 358/1.14 |
| 2006/0289633 A1* | 12/2006 | Moreland et al. | 235/381 |
| 2007/0205274 A1 | 9/2007 | Bridges | |

* cited by examiner

*Primary Examiner* — Shay S Glass
(74) *Attorney, Agent, or Firm* — David R. Stevens; Stevens Law Group

(57) ABSTRACT

The present invention extends to methods, systems, and computer program products for delivering customer specified receipt types at checkout. A customer specifies receipt delivery preferences at a mobile device (e.g., specifying delivery of a digital receipt and/or a paper receipt at checkout). The mobile device sends the customer's receipt delivery preferences to a receipt preferences database server for storage in a receipt preferences database. During a sales transaction, a point-of-sale ("POS") system refers to the receipt preferences database (or a relevant portion thereof) to access the customer's receipt delivery preferences. Based on the customer's receipt delivery preferences, the point-of-sale ("POS") system delivers appropriate types of receipts (e.g. digital and/or paper) to the customer.

18 Claims, 7 Drawing Sheets

DELIVERYING CUSTOMER SPECIFIED RECEIPT TYPES AT CHECKOUT

RELATED APPLICATIONS

This application is related to U.S. application Ser. No. 13/595,458, filed Aug. 27, 2012. The application is incorporated herein by reference for all purposes.

BACKGROUND

1. Field of the Invention

This invention relates generally to the field of electronic sales transactions, and, more particularly, to delivering customer specified receipt types at checkout.

2. Related Art

In a variety of transactions, consumers or buyers of goods or services typically receive receipts from their respective merchants or service providers as proof of existence of conducted transactions. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts can later be used by a consumer for various purposes including, for example, proving participation in a transaction for tax reporting purpose, product returns, use as a claim ticket for a further transaction, provisioning warranties, etc. Depending on a variety of factors, such as, for example, items being purchased, business or personal purchase, amount of purchase, etc., a consumer may desire an electronic receipt and/or a paper receipt.

For in-store purchases, consumers generally obtain a paper receipt at the point-of-sale. However, some point-of-sale systems also support the delivery of digital receipts at the point-of-sale. Further, for telephone or online purchases digital receipts are typically delivered to a customer.

In some situations, receipt deliver mechanisms may be somewhat rigid and may not allow a user to configure desired receipt types (e.g., digital and/or paper) for use at checkout. For example, a conventional point-of-sale ("POS") system typically includes a POS terminal, one or more peripheral devices (display monitor, receipt printer, barcode scanner, weigh scale, electronic signature pad) and a payment processor with pin pad (for credit and debit cards). The data for sales transactions is usually stored in a storage device of the POS terminal, which may be uploaded to one of the remote transaction authorization servers or another remote server of the credit/debit card companies. Although POS systems are well equipped for merchants to monitor and collect transaction data from the POS system, the ability of the customer to input or extract useful information from the POS system is typically limited to pinpad interactions (entering tip amounts, obtaining additional cash back, etc.), and obtaining printed receipts, the format and content of which has been pre-determined by the merchant.

Further, POS systems are typically sold with a proprietary on-board software system that may be specific to the merchant's business. The merchant may be able to make minor programming adjustments to add discount codes and other special offers, but may have limited ability to add functionality to the POS system.

BRIEF DESCRIPTION OF THE DRAWINGS

The specific features, aspects and advantages of the present invention will become better understood with regard to the following description and accompanying drawings where.

DETAILED DESCRIPTION

Figure 1:
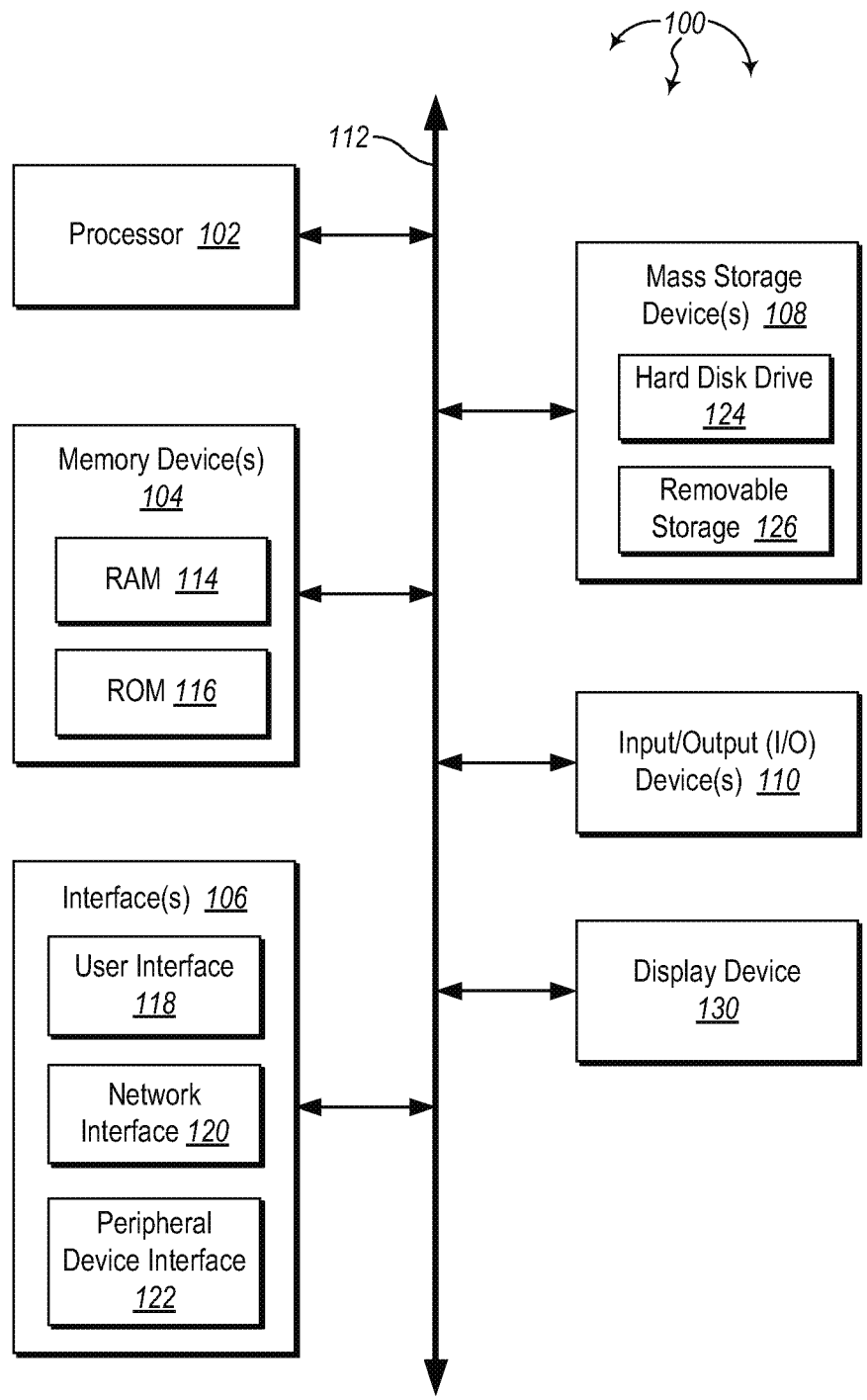
FIG. 1 illustrates an example block diagram of a computing device.

The present invention extends to methods, systems, and computer program products for delivering customer specified receipt types at checkout. In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Within this description and following claims, "customer fingerprint" is defined as an identifier for a customer. A customer fingerprint can be used to associate a customer with corresponding point-of-sale ("POS") data.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the teachings.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases described with respect to the presented invention can be included in a cloud model.

It is further noted that, where feasible, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, embodiments of the invention are directed to delivering customer specified receipt types at checkout. A customer specifies receipt delivery preferences at a mobile device (e.g., specifying delivery of a digital receipt and/or a paper receipt at checkout). The mobile device sends the receipt delivery preferences to a receipt preferences database server. The receipt preferences database server stores an association between the receipt delivery preferences and a customer fingerprint in a receipt preferences database.

Subsequently, the customer can participate in a sales transaction at a store location. As part of the sales transaction, a point-of-sale (POS) system generates receipt data. The point-of-sale (POS) system and the receipt preferences database server interoperate with one another to deliver appropriate receipt types (e.g., digital and/or paper) containing the receipt data.

In some embodiments, the receipt preferences database (or relevant portion thereof) is synced to the point-of-sale (POS) system from time to time. During checkout, a customer provides data for deriving a customer fingerprint to the point-of-sale (POS) system (e.g., by swiping a loyalty card, entering a number on a pin pad, etc.). The point-of-sale (POS) system uses the provided data to derive a customer fingerprint for the customer. The point-of-sale ("POS") system uses the customer fingerprint to locate associated receipt delivery preferences from within the synced receipt preferences database. At the close of a sales transaction, receipts are delivered in accordance with the associated receipt delivery preferences. For example, the point-of-sale ("POS") system can send a digital receipt to a mobile device and/or can print a paper receipt.

In other embodiments, the point-of-sale ("POS") system has an open connection to the receipt preferences database server. In these other embodiments, a customer fingerprint is derived and is used to poll the receipt preferences database server for associated receipt delivery preferences. The receipt preferences database server uses the customer fingerprint to locate the associated receipt delivery preferences from within the receipt preferences database. The receipt preferences database server then returns the associated receipt delivery preferences back to the point-of-sale ("POS") system. At the close of a sales transaction, receipts are delivered in accordance with the associated receipt delivery preferences. For example, the point-of-sale ("POS") system can send a digital receipt to a mobile device and/or can print a paper receipt.

The point-of-sale ("POS") system can poll the receipt preferences database server at specified intervals (e.g., every second) prior to a sales transaction closing. As such, in the event a customer changes specified receipt delivery preferences during a sales transaction, there is an increased chance that the point-of-sale ("POS") system can deliver receipts in accordance with more recently specified receipt delivery preferences.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory ("RAM") 114) and/or nonvolatile memory (e.g., read-only memory ("ROM") 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, sensors, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 can include any number of different network interfaces 120, such as interfaces to personal area networks ("PANs"), local area networks ("LANs"), wide area networks ("WANs"), wireless networks (e.g., near field communication ("NFC"), Bluetooth, Wi-Fi, etc. networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
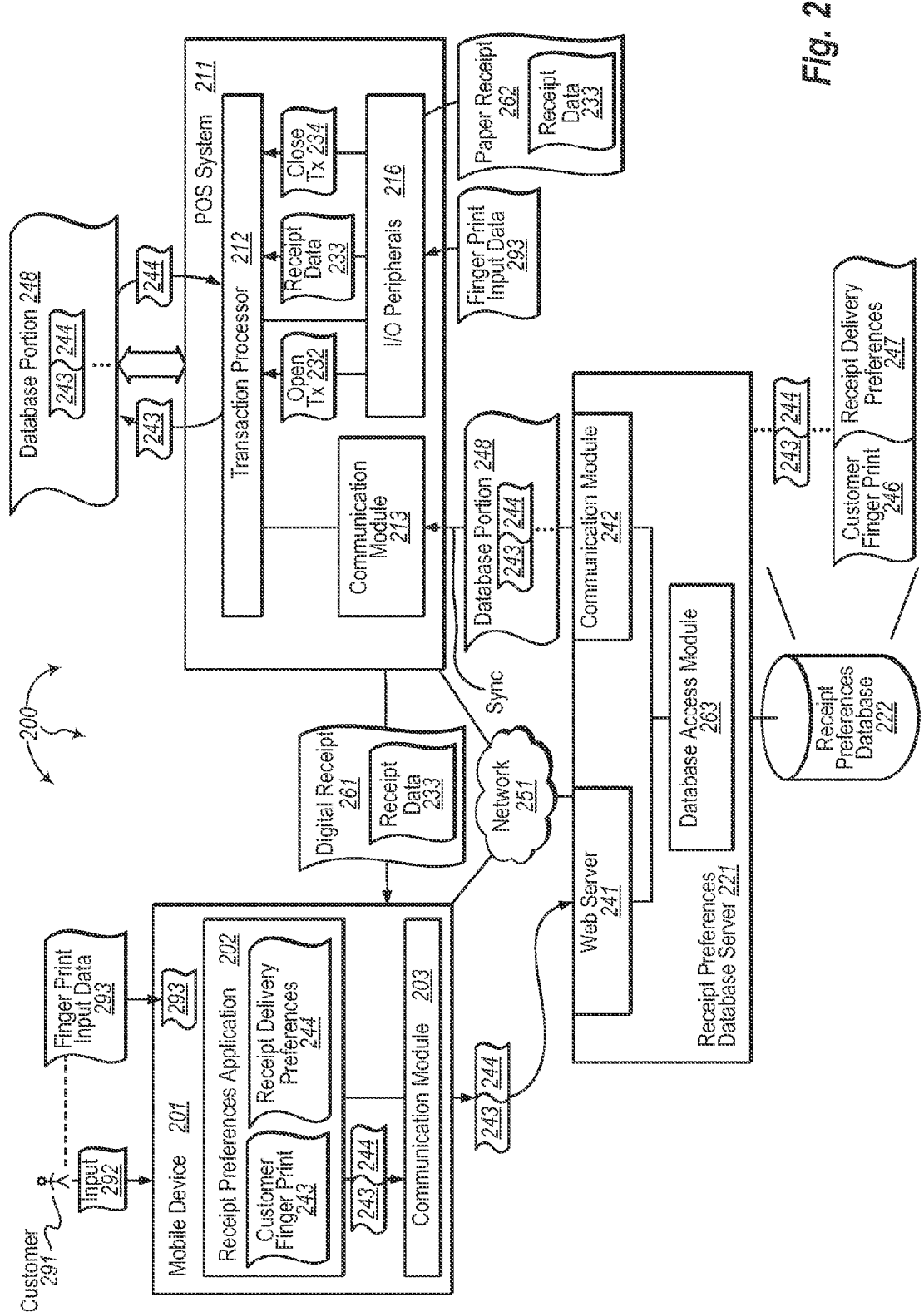
FIG. 2 illustrates an example computer architecture that facilitates delivering customer specified receipt types at checkout.

FIG. 2 illustrates an example computer architecture 200 that facilitates delivering customer specified receipt types at checkout. Referring to FIG. 2, computer architecture 200 includes mobile device 201, POS system 211, and receipt preferences database server 221. Each of the depicted components can be connected to one another over (or be part of) a network, such as, for example, a PAN, a LAN, a WAN, and even the Internet. Accordingly, each of the depicted components as well as any other connected computer system and their component, can create message related data and exchange message related data over the network. For example, message related data may include, but is not limited to, near field communication ("NFC") payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.

As depicted, mobile device 201 (e.g. a smartphone) further includes receipt preferences application 202 and communication module 203. Generally, receipt preferences application 202 is configured to manage receipt preferences (e.g., a desire for digital and/or paper receipts) for user of mobile device 201. Receipt preferences application 202 can also be used to pair customer fingerprint 243 (e.g., derived from a loyalty number, a telephone number, a portion of a credit card number, biometric information, etc.) with mobile device 201. As such, electronic receipts corresponding to customer fingerprint 243 can be delivered to mobile device 201.

Receipt preferences application 202 can include a user-interface and memory permitting a customer to enter, store, and change receipt delivery preferences 244. For example, customer 291 can enter and/or change receipt delivery preferences 244 to enable or disable printing of a paper receipt for sales transactions. A customer can specify that paper receipts are always to be printed, never to be printed, printed at certain locations but not at other locations, printed only for a next sales transaction, etc.

Communication module 203 can be a wireless network adapter for connecting mobile device 201 with a wireless network, such as, for example, Wi-Fi and/or a cellular network (e.g., CDMA, GSM, iDen, etc.) that facilitates a further connection to network 251 (e.g., the Internet).

As depicted, POS system 211 includes transaction processor 212, communication module 213, and I/O peripherals 216. POS system 211 can be physically located at a checkout lane in a store. Generally, transaction processor 212 is configured to manage sales transactions for POS 211. Transaction processor 212 can receive input from I/O peripherals 216 to open a sales transaction, collect receipt data (e.g., date, time, item, and cost data, etc.) for a sales transaction, and close a sales transaction. Receipt data for an item (e.g. item description and item cost) can be retrieved from an item database in response to scanning a barcode on (or otherwise identifying) the item. I/O peripherals 216 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication module 213 can include a wired and/or wireless network adapter for connecting mobile device 201 with a network, such as, for example, a Wi-Fi and/or wired Ethernet network, that facilitates a further connection to network 251 (e.g., the Internet).

POS system 211 can be in a physical store location that is owned by an entity, such as, for example, a retailer corporation that operates a chain of stores. The chain of stores can include one or more of: grocery stores, department stores, warehouse stores, discount stores, etc. In some embodiments, POS system 211 includes components in a checkout isle as well as components in a store based data center.

As depicted, receipt preferences database server 221 includes Web server 241, communication module 242, and database access module 263. In operation, web server 241 is configured to communicate with external devices, such as, for example, mobile device 201. Communication module 242 is configured to communicate with other systems that are commonly owned by the same entity as receipt preferences database server 221. For example, an entity can own one or more physical store locations (e.g. a chain of stores). Each of the one or more store locations can include one or more POS systems 211. Receipt preferences database server 221 can use communication module 242 to communicate with POS systems 211 at the one or more store locations.

Database access module 263 is configured to manage receipt preferences database 272. Receipt preferences database 222 stores receipt delivery preferences for customers that conduct sales transactions at the one or more store locations. Receipt preferences database server 221 can use database access module 263 to receive receipt delivery preferences for a customer from a mobile device through web server 241. Receipt preferences database server 221 can also use database access module 263 to store received receipt delivery preferences in receipt preferences database 222.

Receipt preferences data server 221 can be owned by the same entity (e.g., a retailer corporation) that owns POS system 211. The same entity can also own one or more other POS systems similar to POS system 211. Receipt preferences data server 221 can communicate with POS system 211 and any of the one or more other POS systems to facilitate business operations for the entity.

Thus, from time to time, relevant portions of receipt preferences database 222 can be synced to POS system 211 or another POS system and cached for local access. For example, for a POS system at a particular store location, portions of receipt preferences database 222 relevant to the particular store location can be synced to the POS system. The POS system can then access receipt delivery preferences for a customer locally and deliver receipts to the customer in accordance with their specified receipt delivery preferences (e.g., sending a digital receipt to a mobile device and/or printing a paper receipt).

Figure 3:
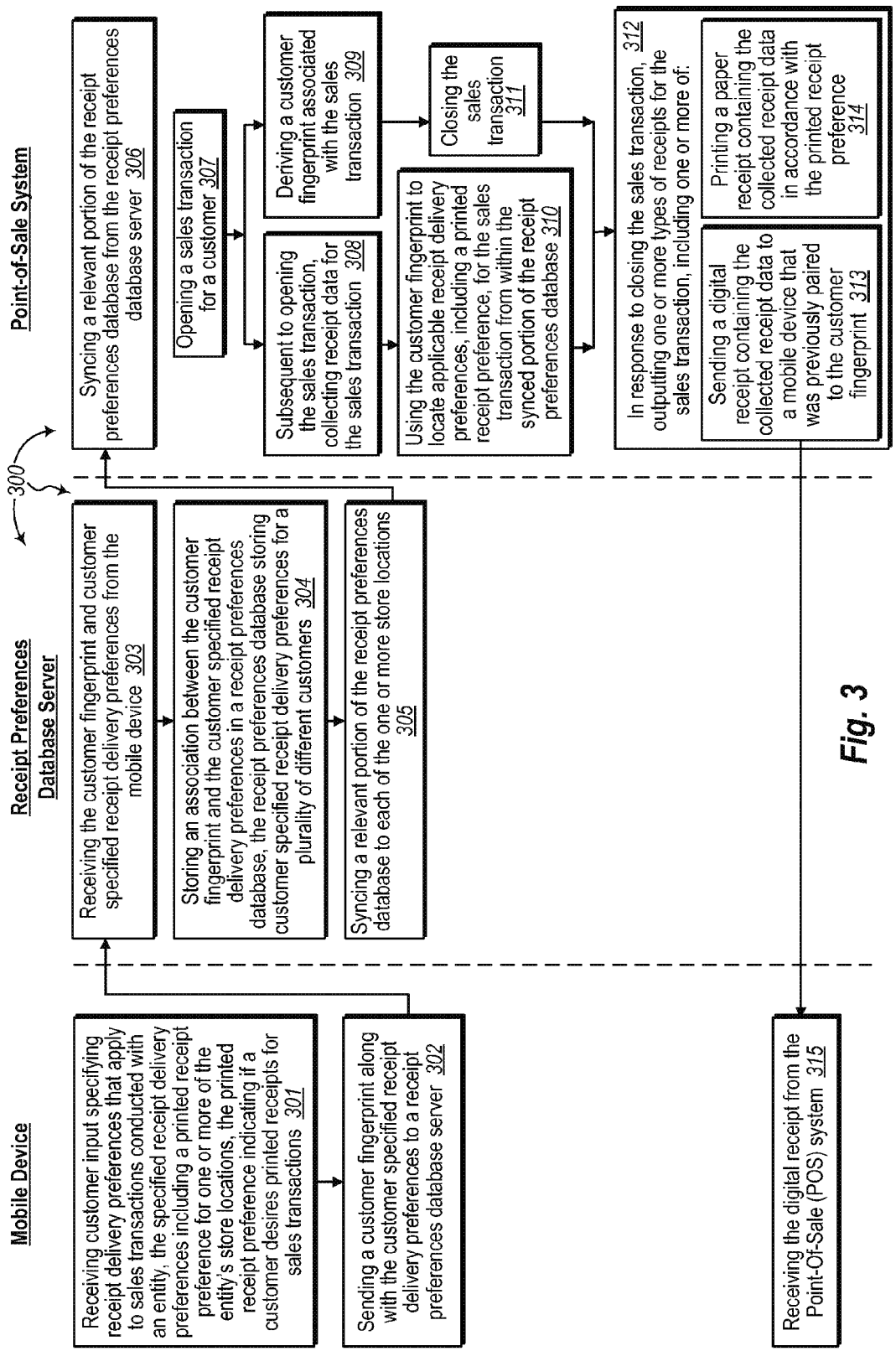
FIG. 3 illustrates a flow chart of an example method for delivering customer specified receipt types at checkout.

FIG. 3 illustrates a flow chart 300 of an example method for delivering customer specified receipt types at checkout. Method 300 will be described with respect to the components and data of computer architecture 200.

Method 300 includes receiving customer input specifying receipt delivery preferences that apply to sales transactions conducted with an entity, the specified receipt delivery preferences including a printed receipt preference for one or more of the entity's store locations, the printed receipt preference indicating if a customer desires printed receipts for transactions (301). For example, mobile device 201 can receive input 292 from customer 291. Input 292 can specify receipt delivery preferences 244 for sales tractions conducted with POS system 211, as well as other commonly owned POS systems. Receipt delivery preferences 244 can include a printed receipt preference indicating if customer 291 desires printed receipts for sales transactions. For example, receipt delivery preferences 244 can specify that customer 291 always wants paper receipts, never wants paper receipts, wants paper receipts at some locations but not at other locations, wants a paper receipt just for the next sales transaction, wants a paper receipt when a sales transaction exceeds a threshold amount (e.g., $75.00 or over), etc. Receipt delivery preferences 244 can also specify that customer 291 always wants digital receipts, never wants digital receipts, wants digital receipts at some locations but not at other locations, wants a digital receipt just for the next sales transaction, wants a digital receipt when a sales transaction is below a threshold amount (e.g., under $75.00), etc.

Method 300 includes sending a customer fingerprint along with the customer specified receipt delivery preferences to a receipt preferences database server (302). For example, communication module 203 can send customer fingerprint 243 (a customer fingerprint associated with customer 291) along with receipt delivery preferences 244 to receipt preferences database server 221. Customer fingerprint 243 can be derived from fingerprint input data 293 including one or more of: a loyalty card number, portions of a credit card number, a phone number, biometric data, etc. In one example, receipt preferences application 202 can include a fingerprint generation algorithm that processes fingerprint input data 293 to derive customer fingerprint 243 for customer 291. Customer 291 can enter fingerprint input data 293 at mobile device 201 (e.g., a loyalty card number or a portion of a credit card number) In another example, mobile device 201 can obtain fingerprint input data internally (e.g., a telephone number associated with mobile device 201).

Method 300 includes receiving the customer fingerprint and customer specified receipt delivery preferences from the mobile device (303). For example, Web server 241 can receive customer fingerprint 243 along with receipt delivery preferences 244 from mobile device 201.

Method 300 includes storing an association between the customer fingerprint and the customer specified receipt delivery preferences in a receipt preferences database, the receipt preferences database storing customer specified receipt delivery preferences for a plurality of different customers (304). For example, database access module 263 can store an association between customer fingerprint 243 and receipt delivery preferences 244 in receipt preferences database 222. Receipt preferences database 222 can also store receipt delivery preferences for one or more other customers.

For each customer, a customer fingerprint can be associated with the customer's specified receipt delivery preferences. For example, for some other customer, another mobile device can derive customer fingerprint 246 (e.g., using the same fingerprint generation algorithm) and receive input specifying receipt delivery preferences 247. The other mobile device can send customer fingerprint 246 along with receipt delivery preferences 247 to receipt preferences database server 221. Database access module 263 can store an association between customer fingerprint 246 and receipt delivery preferences 247 in receipt preferences database 222.

Method 300 includes syncing a relevant portion of the receipt preferences database to each of the one or more store locations (305) and syncing a relevant portion of the receipt preferences database from the receipt preferences database server (306). For example, database portion 248 (of receipt preferences database 222) can be synced from receipt preferences database server 221 to POS system 211. Database portion 248 can include receipt delivery preferences corresponding to the store (physical) location of POS system 211. Other portions of receipt preferences database 222 can be synced to other store locations. In some embodiments, receipt preferences database 222 is synced in its entirety to each of the one or more store locations.

Method 300 includes opening a sales transaction for a customer (307). For example, customer 291 can make one or more items they wish to purchase available to a cashier. The cashier can then process (e.g., scan) each of the items as part of a checkout procedure. Alternately, the customer 291 can process (e.g., scan) each of the one or more items himself or herself as part of a self-checkout procedure. As part of the checkout process, customer 291 or a cashier can enter commands at I/O peripherals 216 to start a new sales transaction. In response, I/O peripherals 216 can send open transaction message 232 to transaction processor 212. Transaction processor 212 can receive open transaction message 232 from I/O peripherals 216. In response to open transaction message 232, transaction processor 212 can open a sales transaction to process the one or more items for customer 291.

Method 300 includes subsequent to opening the sales transaction, collecting receipt data for the sales transaction (308). For example, in response to opening the sales transaction, transaction processor 212 can collect receipt data 233 for each of the one or more items that is processed (e.g., scanned) during the sales transaction.

Method 300 includes deriving a customer fingerprint associated with the sales transaction (309). For example, customer 291 can use an I/O peripheral from among I/O peripherals 216 (e.g., a card reader or pin pad) to enter fingerprint input data 293 into POS system 211. POS system 211 can use the same fingerprint generation algorithm as mobile device 201 to derive customer fingerprint 243 from fingerprint input data 293.

Method 300 includes using the customer fingerprint to locate applicable receipt delivery preferences, including a printed receipt preference, for the sales transaction from within the synced portion of the receipt preferences database (310). For example, transaction processor 212 can use customer fingerprint 243 to locate receipt delivery preferences 244 from within database portion 248. As described, receipt delivery preferences 244 includes a printed receipt preference indicating whether or not customer 291 desires a printed receipt for the sales transaction.

Method 300 includes closing the sales transaction (311). For example, when each of the one or more items has been processed (e.g., scanned), a cashier or customer 291 can enter commands at I/O peripherals 216 to end the sales transaction. In response, I/O peripherals 216 can send close transaction message 234 to transaction processor 212. Transaction processor 212 can receive close transaction message 234 from I/O peripherals 216. In response to close transaction message 234, transaction processor 212 can close the sales transaction processing the one or more items for customer 291.

Method 300 includes in response to closing the sales transaction, outputting one or more types of receipts for the sales transaction (312). For example, in response to closing the sales transaction for customer 291, POS system 211 can output one or more types of receipts, such as, for example, digital and/or printed receipts, for the sales transaction.

Outputting one or more types of receipts for the sales transaction can include sending a digital receipt containing the collected receipt data to a mobile device that was previously paired to the customer fingerprint (313). For example, POS system 211 can send digital receipt 261, including receipt data 233, to mobile device 201. Alternately, POS system 211 can send digital receipt 261, including receipt data 233, to receipt preferences database server 221. Receipt preferences database server 221 can store digital receipt 261. Receipt preferences database server 221 can also store an association between customer fingerprint 243 and receipt 261.

Outputting one or more types of receipts for the sales transaction can include printing a paper receipt containing the collected receipt data in accordance with the printed receipt preference (314). In some embodiments, receipt delivery preferences 244 specify that a paper receipt is desired for the sales transaction. In these embodiments, an I/O peripheral, such as, for example, a receipt printer in I/O peripherals 216, can print receipt data 233 in paper receipt 262. In other embodiments, receipt delivery preferences 244 specify that a printed receipt is not desired for the sales transaction. In these other embodiments, a paper receipt is not printed.

Method 300 includes receiving the digital receipt from the Point-Of-Sale (POS) system (315). For example, mobile device 201 can receive digital receipt 261, including receipt data 233, from POS system 211. Alternately, mobile device 201 can request digital receipts from receipt preferences database server 221. For example, mobile device 201 can send a request to receipt preferences database server 221 for any digital receipts associated customer fingerprint 243. In response, receipt preferences database server 201 can return digital receipts associated with customer fingerprint 243, including digital receipt 261, back to mobile device 201. Customer 291 can then view receipt data 233 on mobile device 201.

In embodiments where paper receipt 262 is printed, customer 291 can also obtain paper receipt 262, either directly (e.g., when doing self-checkout) or from a cashier.

Figure 4:
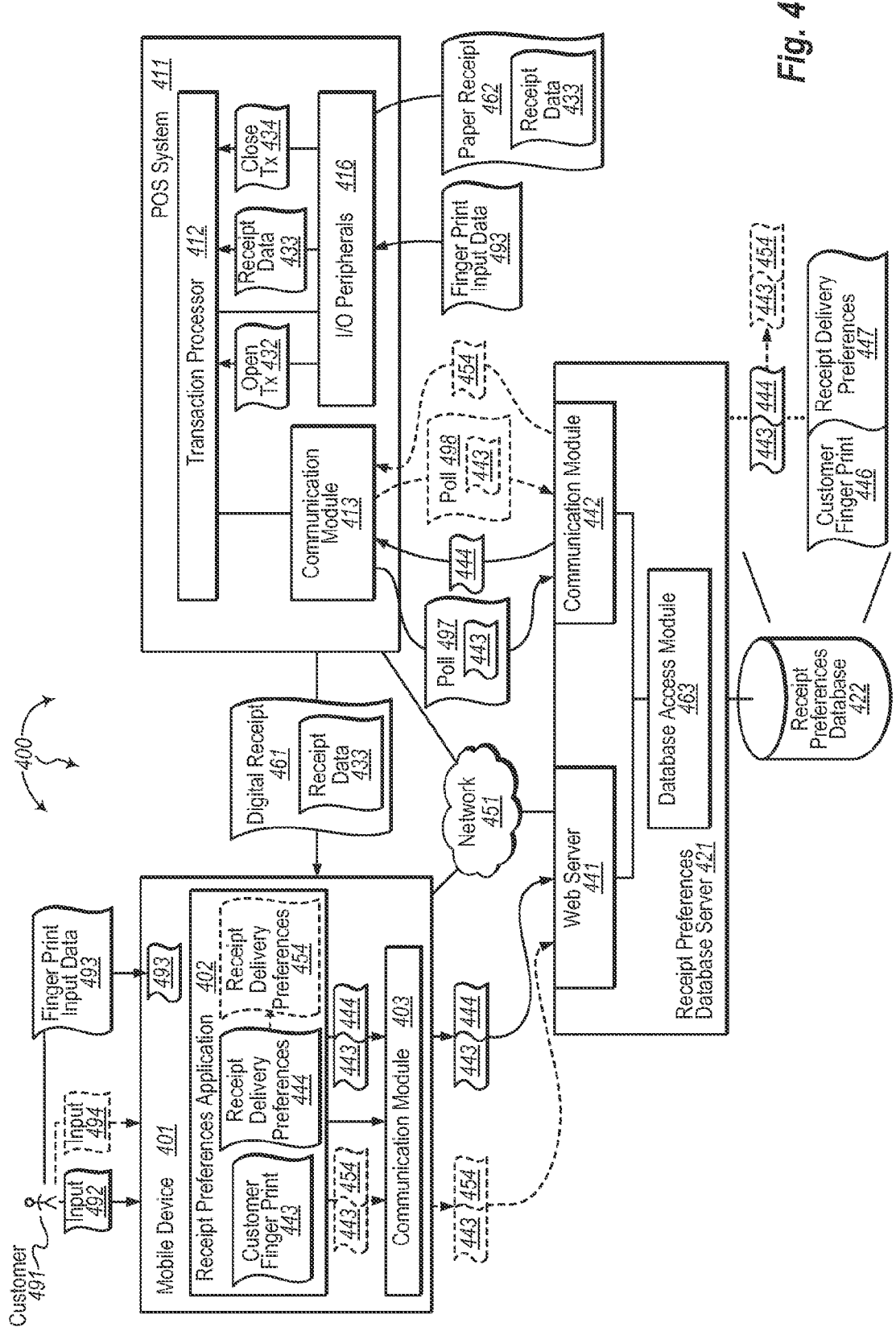
FIG. 4 illustrates another example computer architecture that facilitates delivering customer specified receipt types at checkout.

FIG. 4 illustrates an example computer architecture 400 that facilitates delivering customer specified receipt types at checkout. Referring to FIG. 4, computer architecture 400 includes mobile device 401, POS system 411, and receipt preferences database server 421. Each of the depicted components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, mobile device 401 (e.g., a smartphone) further includes receipt preferences application 402 and communication module 403. Generally, receipt preferences application 402 is configured to manage receipt preferences (e.g., a desire for digital and/or paper receipts) for user of mobile device 401. Receipt preferences application 402 can also be used to pair customer fingerprint 443 (e.g., data derived from a loyalty number, telephone number, a portion of a credit card number, biometric information, etc.) with mobile device 401. As such, electronic receipts corresponding to customer fingerprint 443 can be delivered to mobile device 401.

Receipt preferences application 402 can include a user-interface permitting a customer to enter and change receipt delivery preferences. For example, customer 491 can enter and/or change receipt delivery preferences to enable or disable printing of a paper receipt for sales transactions. A customer can specify that paper receipts are always to be printed, never to be printed, printed at certain locations but not at other locations, printed only for a next sales transaction, etc.

Communication module 403 can be a wireless network adapter for connecting mobile device 201 with a wireless network, such as, for example, Wi-Fi and/or a cellular network (e.g., CDMA, GSM, iDen, etc.) that facilitates a further connection to network 451 (e.g., the Internet).

As depicted, POS system 411 includes transaction processor 412, communication module 413, and I/O peripherals 416. POS 411 can be physically located at a checkout lane in a store. Generally, transaction processor 412 is configured to manage sales transactions for POS 411. Transaction processor 412 can receive input from I/O peripherals 416 to open a sales transaction, collect receipt data (e.g., date, time, item, and cost data, etc.) for a sales transaction, and close a sales transaction. Receipt data for an item (e.g. item description and item cost) can be retrieved from an item database in response to scanning a barcode on (or otherwise identifying) the item. I/O peripherals 416 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication module 413 can be a wired and/or wireless network adapter for connecting mobile device 401 with a network, such as, for example, a Wi-Fi and/or wired Ethernet network, that facilitates a further connection to network 451 (e.g., the Internet).

POS system 411 can be in a physical store location that is owned by an entity, such as, for example, a retailer corporation that runs a chain of stores. The chain of stores can include one or more of: grocery stores, department stores, warehouse stores, discount stores, etc. In embodiments, POS system 411 includes components in a checkout isle as well as components in a store based data center.

As depicted, receipt preferences data server 421 includes Web server 441, communication module 442, and database access module 463. Web server 441 is configured to communicate with external devices, such as, for example, mobile device 401. Communication module 441 is configured to communicate with other systems that are commonly owned by the same entity as receipt preferences database server 421. For example, an entity can own one or more physical store locations (e.g. a change of stores). Each of the one or more store locations can include one or more POS systems 411. Receipt preferences database server 421 can use communication module 442 to communicate with POS systems at the one or more store locations.

Database access module 463 is configured to manage receipt preferences database 472. Receipt preferences database 472 stores receipt delivery preferences for customers that conduct sales transactions at the one or more store locations. Receipt preferences database server 421 can receive receipt deliver preferences for a customer from a mobile device through Web server 441. Receipt preferences database server 421 can use database access module 463 to store received receipt delivery preferences in receipt preferences database 422.

Receipt preferences database server 421 can be owned by the same entity (e.g., a retailer corporation) that owns POS system 411. The same entity can also own one or more other POS systems similar to POS system 411. Receipt preferences database server 421 can communicate with POS system 411 and any of the one or more other POS systems to facilitate business operations for the entity.

Thus, from time to time, POS systems, such as, for example, POS system 411, can poll receipt preferences database server 421 to obtain stored receipt delivery preferences for a customer. Receipts can be delivered to the customer in accordance with the receipt delivery preferences (e.g., sending a digital receipt to a mobile device and/or printing a paper receipt). In some embodiments, a POS system polls receipt preferences database server 421 at specified intervals (e.g., every second). Thus, if a customer changes receipt delivery preferences during a sales transaction, there is an increased chance that more recent receipt delivery preferences can be detected prior to closing the sales transaction. The POS system can then deliver receipts to the customer in accordance with the more recent receipt delivery preferences.

Figure 5:
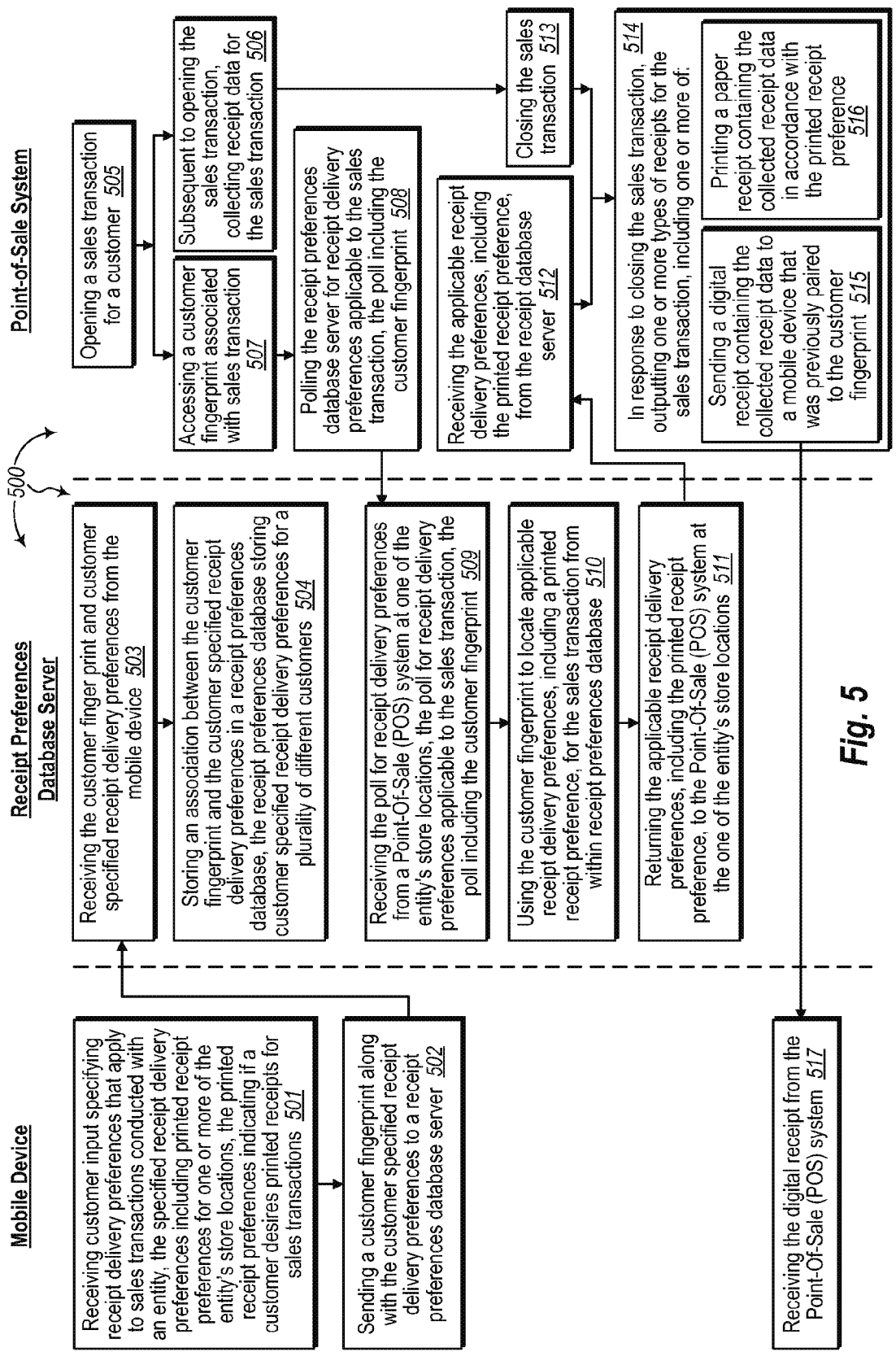
FIG. 5 illustrates another flow chart of an example method for delivering customer specified receipt types at checkout.

FIG. 5 illustrates a flow chart of an example method 500 for delivering customer specified receipt types at checkout. Method 500 will be described with respect to the components and data of computer architecture 400.

Method 500 includes receiving customer input specifying receipt delivery preferences that apply to sales transactions conducted with an entity, the specified receipt delivery preferences including printed receipt preferences for one or more of the entity's store locations, the printed receipt preferences indicating if a customer desires printed receipts for transactions (501). For example, mobile device 401 can receive input 492 from customer 491. Input 492 can specify receipt delivery preferences 444 for sales tractions conducted with POS system 411, as well as other commonly owned POS systems. Receipt delivery preferences 444 can include a printed receipt preference indicating if customer 491 desires printed receipts for sales transactions. For example, receipt delivery preferences 444 can specify that customer 491 always wants paper receipts, never wants paper receipts, wants paper receipts at some locations but not at other locations, wants a paper receipt just for the next sales transaction, wants a paper receipt when a sales transaction exceeds a threshold amount (e.g., $75.00), etc.

Method 500 includes sending a customer fingerprint along with the customer specified receipt delivery preferences to a receipt preferences database server (502). For example, communication module 403 can send customer fingerprint 443 (a customer fingerprint associated with customer 491) along with receipt delivery preferences 444 to receipt preferences database server 421. Customer fingerprint 443 can be derived from fingerprint input data 493 including one or more of: a loyalty card number, portions of a credit card number, a phone number, etc. Receipt preferences application 402 can include a fingerprint generation algorithm that processes fingerprint input data 493 to derive customer fingerprint 443 for customer 491. In another example, mobile device 401 can obtain fingerprint input data internally (e.g., a telephone number associated with mobile device 401).

Method 500 includes receiving the customer finger print and customer specified receipt delivery preferences from the mobile device (503). For example, Web server 441 can receive customer fingerprint 443 along with receipt delivery preferences 444 from mobile device 401.

Method 500 includes storing an association between the customer fingerprint and the customer specified receipt delivery preferences in a receipt preferences database, the receipt preferences database storing customer specified receipt delivery preferences for a plurality of different customers (504). For example, database access module 463 can store an association between customer fingerprint 443 and receipt delivery preferences 444 in receipt preferences database 422. Receipt preferences database 442 can also store receipt delivery preferences for one or more other customers.

For each customer, a customer fingerprint can be associated with the customer's specified receipt delivery preferences. For example, for some other customer, another mobile device can derive customer fingerprint 446 (e.g., using the same fingerprint generation algorithm) and receive input specifying receipt delivery preferences 447. The other mobile device can send customer fingerprint 446 along with receipt delivery preferences 447 to receipt preferences database server 421. Database access module 463 can store an association between customer fingerprint 446 and receipt delivery preferences 447 in receipt preferences database 422.

Method 500 includes opening a sales transaction for a customer (505). For example, customer 491 can make one or more items they wish to purchase available to a cashier. The cashier can then process (e.g., scan) each of the items as part of a checkout procedure. Alternately, the customer 491 can process (e.g., scan) each of the one or more items himself or herself as part of a self-checkout procedure. As part of the checkout process, customer 491 or a cashier can enter commands at I/O peripherals 416 to start a new sales transaction. In response, I/O peripherals 416 can send open transaction message 432 to transaction processor 412. Transaction processor 412 can receive open transaction message 432 from I/O peripherals 416. In response to open transaction message 432, transaction processor 412 can open a sales transaction to process the one or more items for customer 491.

Method 500 includes subsequent to opening the sales transaction, collecting receipt data for the sales transaction (506). For example, in response to opening the sales transaction, transaction processor 412 can collect receipt data 433 for each of the one or more items that is processed (e.g., scanned) during the sales transaction.

Method 500 includes accessing a customer fingerprint associated with sales transaction (507). For example, customer 491 can use an I/O peripheral from among I/O peripherals 416 (e.g., a card reader or pin pad) to enter fingerprint input data 493 into POS system 411. POS system 411 can use the same fingerprint generation algorithm as mobile device 401 to derive customer fingerprint 443 from fingerprint input data 493.

Method 500 includes polling the receipt preferences database server for receipt delivery preferences applicable to the sales transaction, the poll including the customer fingerprint (508). Method 500 includes receiving the poll for receipt delivery preferences from a Point-Of-Sale (POS) system at one of the entity's store locations, the poll for receipt delivery preferences applicable to the sales transaction, the poll including the customer fingerprint (509). For example, communication module 413 can send poll 497, including customer fingerprint 443, to receipt preferences database server 421. Poll 497 requests receipt delivery preferences applicable to the sales transaction for customer 491. Communication module 442 can receive poll 497 from POS system 411.

Method 500 includes using the customer fingerprint to locate applicable receipt delivery preferences, including a printed receipt preference, for the sales transaction from within receipt preferences database (510). For example, database access module 463 can use customer fingerprint 443 to locate receipt delivery preferences 444 from within receipt preferences database 422. As described, receipt delivery preferences 444 includes a printed receipt preference indicating whether or not customer 491 desires a printed receipt for the sales transaction.

Method 500 includes returning the applicable receipt delivery preferences, including the printed receipt preference, to the Point-Of-Sale (POS) system at the one of the entity's store locations (511). Method 500 includes receiving the applicable receipt delivery preferences, including the printed receipt preference, from the receipt database server (512). For example, communication module 442 can return receipt delivery preferences 444 to POS system 411. Communication module 413 can receive receipt delivery preferences 444 from receipt preferences database server 421.

As described, POS system 411 can poll receipt preferences database server 421 at specified intervals. The specified interval can be (potentially significantly) smaller than the time for completing a sales transition. For example, POS system 411 can poll receipt preferences database server 421 every second. The smaller specified interval can allow POS system 211 to detect changes to receipt delivery preferences for a customer even after a transaction has been opened for the customer.

For example, prior to the transaction for customer 491 being closed, mobile device 401 can receive input 494 from customer 491. Input 494 can specify receipt delivery preferences 454 for sales tractions conducted with POS system 411, as well as other commonly owned POS systems. Receipt delivery preferences 454 can include a printed receipt preference indicating if customer 451 desires printed receipts for sales transactions. Receipt delivery preferences 454 can differ from receipt delivery preferences 444. For example, receipt delivery preferences 444 may specify that customer 491 never wants a paper receipt. On the other hand, receipt delivery preferences 444 may specify that customer 491 wants a paper receipt just for the next sales transaction.

Communication module 403 can send customer fingerprint 443 along with receipt delivery preferences 454 to receipt preferences database server 421. Web server 441 can receive customer fingerprint 443 along with receipt delivery preferences 454 from mobile device 401. Database access module 463 can store an association between customer fingerprint 443 and receipt delivery preferences 454 in receipt preferences database 422 (thus overwriting the previous association between customer fingerprint 443 and receipt delivery preferences 444).

Subsequent to storage of the association between customer fingerprint 443 and receipt delivery preferences 444 and prior to the sales transaction for customer 491 being closed, communication module 413 can send poll 498, including customer fingerprint 443, to receipt preferences database server 421. Poll 498 requests receipt delivery preferences applicable to the sales transaction for customer 491. Communication module 442 can receive poll 498 from POS system 411. Database access module 463 can use customer fingerprint 443 to locate receipt delivery preferences 454 from within receipt preferences database 422. Receipt delivery preferences 454 can include a printed receipt preference (which may differ from a printed receipt preference in receipt delivery preferences 444) indicating whether or not customer 491 desires a printed receipt for the sales transaction.

If further changes to receipt delivery preferences are received at mobile device 401, the further changes can be sent to receipt preferences database server 421 for storage in receipt preferences database 422. POS system 411 can continue to poll receipt preferences database server 421 for receipt delivery preferences for the sales transaction until the sales transaction is closed. Since the specified interval (e.g., one second) is small relative to the time for completing a sales transaction, there is a significantly increased chance that POS system 411 can detect more (or even most) recent receipt delivery preferences for a customer prior to a sales transaction closing.

Method 500 includes closing the sales transaction (513). For example, when each of the one or more items has been processed (e.g., scanned), a cashier or customer 491 can enter commands at I/O peripherals 416 to end the sales transaction. In response, I/O peripherals 416 can send close transaction message 434 to transaction processor 412. Transaction processor 412 can receive close transaction message 434 from I/O peripherals 416. In response to close transaction message 434, transaction processor 412 can close the sales transaction processing the one or more items for customer 491.

Method 500 includes, in response to closing the sales transaction, outputting one or more types of receipts for the sales transaction (514). For example, in response to closing the sales transaction for customer 491, POS system 411 can output one or more types of receipts, such as, for example, digital and/or printed receipts, for the sales transaction.

Outputting one or more types of receipts for the sales transaction can include sending a digital receipt containing the collected receipt data to a mobile device that was previously paired to the customer fingerprint (515). For example, POS system 411 can send digital receipt 461, including receipt data 433, to mobile device 401. Alternately, POS system 411 can send digital receipt 461, including receipt data 433, to receipt preferences database server 421. Receipt preferences database server 421 can store digital receipt 461. Receipt preferences database server 421 can also store an association between customer fingerprint 443 and receipt 461.

Outputting one or more types of receipts for the sales transaction can include printing a paper receipt containing the collected receipt data in accordance with the printed receipt preference (516). In some embodiments, receipt delivery preferences 444 specify that a paper receipt is desired for the sales transaction. In these embodiments, an I/O peripheral, such as, for example, a receipt printer in I/O peripherals 416, can print receipt data 433 in paper receipt 462. In other embodiments, receipt delivery preferences 444 specify that a printed receipt is not desired for the sales transaction. In these other embodiments, a paper receipt is not printed.

Method 500 includes receiving the digital receipt from the Point-Of-Sale (POS) system (517). For example, mobile device 401 can receive digital receipt 461, including receipt data 433, from POS system 411. Alternatively, mobile device 401 can request digital receipts from receipt preferences database server 421. For example, mobile device 401 can send a request to receipt preferences database server 421 for any digital receipts associated customer fingerprint 443. In response, receipt preferences database server 421 can return digital receipts associated with customer fingerprint 443, including digital receipt 461, back to mobile device 401. Customer 491 can then view receipt data 433 on mobile device 201.

In embodiments where paper receipt 462 is printed, customer 491 can also obtain paper receipt 462, either directly (e.g., when doing self-checkout) or from a cashier.

Figure 6:
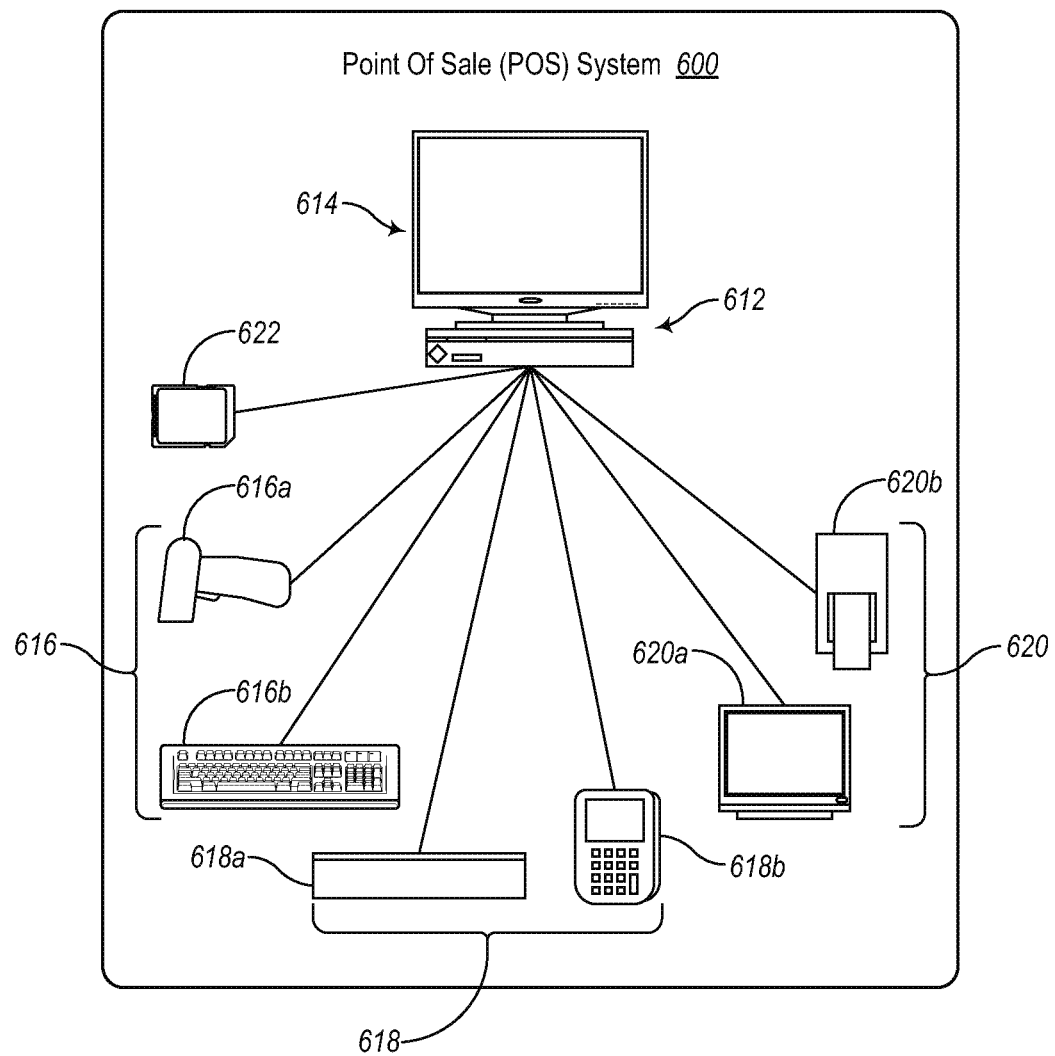
FIG. 6 illustrates an example schematic block diagram of a point-of-sale ("POS") system.

Turning to FIG. 6, FIG. 6 illustrates an example schematic block diagram of a point-of-sale (POS) system 600. In some embodiments, the hardware, software, or hardware and software of POS system 600 may be configured to implement one or more methods in accordance with the present invention. For example, POS system 600 may be manufactured, programmed, modified, or upgraded to support transferring digital receipt data to mobile devices. Any of POS systems 211 and 411 can be a POS system similar to POS system 600.

POS system 600 can include various components. In some embodiments, POS system 600 includes a central or primary computer 612, a monitor 614 (e.g., a cashier-facing monitor 614), one or more input devices 616 (e.g., scanners 616*a*, keyboards 616*b*, scales, or the like), one or more payment devices 618 (e.g., cash drawers 618*a*, card readers 618*b*) for receiving or returning payments, one or more output devices 620 (e.g., customer-facing display 620*a* or monitor 620*a*, receipt printer 620*b*), or the like or combinations or subcombinations thereof, and NFC module 622, such as, for example, an NFC dongle.

Computer 612 may form the backbone of POS system 600. Other components 616, 618, 620, 622 forming part of a POS system 600 can communicate with computer 612. Input devices 616 and certain payment devices 618 can feed data and commands to computer 612 for processing or implementation. For example, scanner 616*a* can pass data communicating the identity of one or more items to be purchased, returned, or the like to a computer 612. Similarly, card reader 618*b* can pass payment information to computer 612.

On the other hand, output devices 620 and certain payment devices 618 can follow or implement commands issued by computer 612. For example, cash drawer 618*a* may open in accordance with the commands of computer 612. Similarly, customer-facing display 620*a* and receipt printer 620*b* can display or output data or information as instructed by computer 612.

In some embodiments, in addition to handling consumer transactions (e.g., purchases, returns), POS system 600 can provide or support certain "back office" functionality. For example, POS system 600 can provide or support inventory control, purchasing, receiving and transferring products, or the like. POS system 600 can also store sales and customer information for reporting purposes, marketing purposes, receivables management, trend analysis, cost analysis, price analysis, profit analysis, or the like. If desired or necessary, POS system 600 can include an accounting interface to pass certain information to one or more in-house or independent accounting applications.

Figure 7:
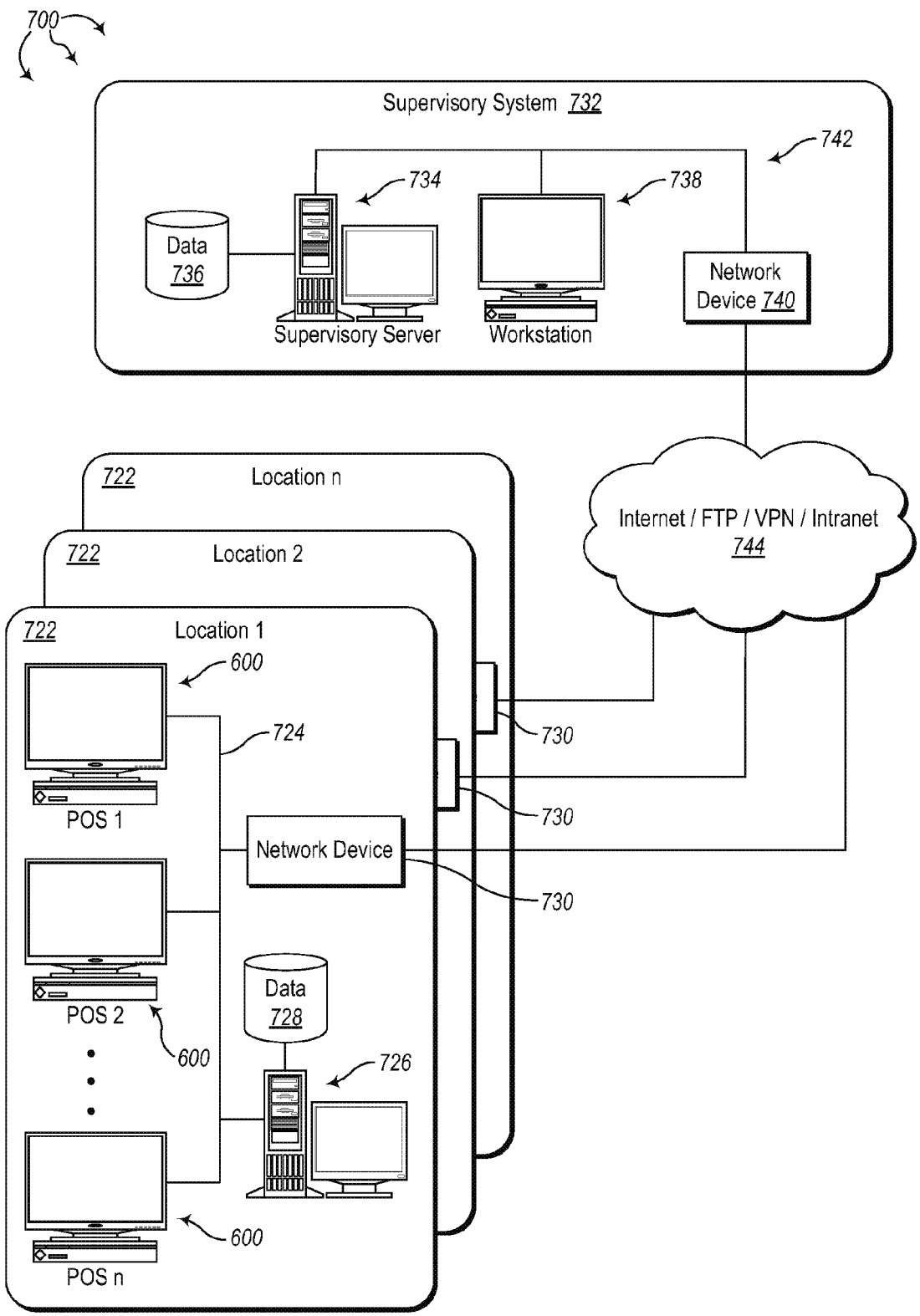
FIG. 7 illustrates an example schematic block diagram of a network of point-of-sale ("POS") systems.

In some embodiments, POS system 600 operates substantially independently, as a stand-alone unit. Alternately, POS system 600 may be one of several POS systems 600 forming the front line of a larger system. FIG. 7 illustrates an example schematic block diagram of a network 700 of point-of-sale (POS) systems 600. For example, multiple POS systems 600 may operate at a particular location 722 (e.g., within a retail, brick-and-mortar store). In such embodiments, the various POS systems 600 may be interconnected via LAN 724. LAN 724 may also connect the POS systems 600 to a local server 726.

Local server 726 can support the operation of the associated POS systems 600. For example, a server 726 may provide a central repository from which certain data needed by the associated POS systems 600 may be stored, indexed, accessed, or the like. Server 726 can serve certain software to one or more POS systems 600. In certain embodiments, a POS system 600 can offload certain tasks, computations, verifications, or the like to server 726.

Alternatively, or in addition thereto, server 726 can support certain back office functionality. For example, server 726 can receive and compile (e.g., within an associated database 728) data from the various associated POS systems 600 to provide or support inventory control, purchasing, receiving and transferring products, or the like. Server 726 can also receive and compile sales and customer information for reporting purposes, marketing purposes, receivables management, trend analysis, cost analysis, price analysis, profit analysis, or the like.

In some embodiments, one or more POS systems 600 and/or servers 726 corresponding to a particular location 722 can communicate with or access one or more remote computers or resources via one or more network devices 730. For example, a network device 730 can enable a POS system 600 to contact outside resources and verify the payment credentials (e.g., credit card information) provided by a customer. A network device 730 can comprise a modem, router, or the like.

In selected embodiments, POS systems 600 operate within an enterprise-wide system 731 comprising multiple locations 722 (e.g., branches 722 or stores 722). In such embodiments, each location 722 may have one or more POS systems 600, local servers 726, local databases 728, network devices 730, or the like or combinations or sub-combinations thereof connected by a computer network (e.g., a LAN 724). It may be that any of data receipt servers 221 and 421 are included in and/or include the functionality of a local server 726.

Additionally, each such location 722 may be configured to interact with one or more supervisory systems 732. For example, multiple branch locations 722 may report to an associated "headquarters" location or system. It may be that any of data receipt servers 221 and 421 are included in and/or include the functionality of a supervisory system 732.

A supervisory system 732 can include one or more supervisory servers 734, databases 736, workstations 738, network devices 740, or the like or combinations or sub-combinations thereof. The various components of a supervisory system 732 can be interconnected via a computer network (e.g., a LAN 742). In selected embodiments, a supervisory system 732 includes one or more supervisory servers 734 providing a central repository from which certain data needed by the one or more POS systems 600 or local servers 726 may be stored, indexed, accessed, or the like.

Alternatively, or in addition thereto, a supervisory server 734 can receive and compile (e.g., within an associated database 736) data from the various associated POS systems 600 or local servers 726 to provide or support inventory control, purchasing, receiving and transferring products, or the like. A supervisory server 734 may also receive and compile sales and customer information for reporting purposes, marketing purposes, receivables management, trend analysis, cost analysis, price analysis, profit analysis, or the like.

A supervisory system 732 can be connected to one or more associated locations 922 or branches 722 in via any suitable computer network 744 (e.g., WAN 744). For example, in selected embodiments, one or more locations 722 can connect to a supervisor system 732 via the Internet. Communication over such a network 744 can follow any suitable protocol or security scheme. For example, communication may utilize the File Transfer Protocol (FTP), a virtual private network (VPN), intranet, or the like.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. At a receipt preferences database server for an entity, the receipt preferences database server including one or more processors and system memory, the receipt preferences database server connected to one or more Point-Of-Sale (POS) systems at each of one or more store locations for the entity, the receipt preferences database server configured to manage a receipt preferences database for the entity, a method for delivering customer specified receipt types at checkout, the method comprising:
   receiving customer specified receipt delivery preferences and a customer fingerprint from a mobile device, the customer specified receipt delivery preferences specified through the mobile device by a customer of the entity, the customer specified receipt delivery preferences including a printed receipt preference for the one or more store locations, the printed receipt preference indicating when a customer desires printed receipts to be provided along with digital receipts for sales transactions;
   storing an association between the customer fingerprint and the customer specified receipt delivery preferences in the receipt preferences database, the receipt preferences database storing customer specified receipt delivery preferences for a plurality of different customers, including the customer;
   subsequent to storing the association between the customer fingerprint and the customer specified receipt delivery preferences, receiving a poll for receipt delivery preferences applicable to a sales transaction at a store location, the store location included in the one or more store locations, the poll including the customer fingerprint;
   using the customer fingerprint to identify the customer specified receipt delivery preferences, including the printed receipt preference, from within the receipt preferences database; and
   returning the customer specified receipt delivery preferences, including the printed receipt preference, to the store location for use in determining if a paper receipt is to be provided along with a digital receipt for the sales transaction.

2. The method of claim 1, wherein receiving customer specified receipt delivery preferences and a customer fingerprint from a mobile device comprises receiving a customer fingerprint that was derived at the mobile device from one of: a loyalty number, a telephone number, or a portion of a credit card number.

3. The method of claim 1, wherein receiving customer specified receipt delivery preferences and a customer fingerprint from a mobile device comprises receiving customer specified receipt delivery preferences including a printed receipt preference that specifies paper receipts are to be printed for the customer.

4. The method of claim 1, wherein receiving a poll for receipt delivery preferences applicable to a sales transaction comprises receiving a poll including the customer fingerprint, the customer fingerprint derived at a Point-Of-Sale (POS) computer system from one of: a loyalty number, a telephone number, or a portion of a credit card number.

5. The method of claim 1, wherein returning the customer specified receipt delivery preferences to the store location comprises returning customer specified receipt delivery preferences, including a printed receipt preference that specifies paper receipts are to be printed for the sales transaction.

6. The method of claim 1, wherein returning the customer specified receipt delivery preferences to the store location comprises returning customer specified receipt delivery preferences, including a printed receipt preference that specifies paper receipts are not to be printed for the sales transaction.

7. A system for delivering customer specified receipt types at checkout, the system comprising:
   a receipt preferences database for an entity, the entity having one or more store locations, the receipt preferences database storing associations between customer fingerprints for a plurality of customers and associated customer specified receipt delivery preferences for the plurality of customers, the specified receipt delivery preferences for each of the plurality of customers including a printed receipt preference indicating if the customer desires printed receipts for sales transactions;

a receipt preferences database server, the receipt preferences database server comprising:
  one or more processors;
  system memory;
  a Web server for receiving customer specified receipt delivery preferences and customer fingerprints from mobile devices;
  a communication module for sending customer specified receipt delivery preferences to the one or more store locations; and
  one or more computer storage media having stored thereon computer-executable instructions that, when executed, cause the receipt preferences database server to:
    receive customer specified receipt delivery preferences and a customer fingerprint from a mobile device, the customer specified receipt delivery preferences specified through the mobile device by a customer of the entity, the customer specified receipt delivery preferences including a printed receipt preference for the one or more store locations, the printed receipt preference indicating when a customer desires printed receipts to be provided along with digital receipts for sales transactions;
    store an association between the customer fingerprint and the customer specified receipt delivery preferences in the receipt preferences database, the receipt preferences database storing customer specified receipt delivery preferences for a plurality of different customers, including the customer;
    subsequent to storing the association between the customer fingerprint and the customer specified receipt delivery preferences, receive a poll for receipt delivery preferences applicable to a sales transaction at a store location, the store location included in the one or more store locations, the poll including the customer fingerprint;
    use the customer fingerprint to identify the customer specified receipt delivery preferences, including the printed receipt preference, from within the receipt preferences database; and
    return the customer specified receipt delivery preferences, including the printer receipt preference, to the store location for use in determining if a paper receipt is to be provided along with a digital receipt for the sales transaction; and a Point-Of-Sale (POS) computer system at each of the one or more locations, the Point-Of-Sale (POS) computer system comprising:
  one or more processors;
  system memory;
  a communication module for receiving customer specified receipt delivery preferences from the receipt preferences database server;
  one or more I/O peripherals; and
  one or more computer storage media having stored thereon computer-executable instructions that, when executed, cause the Point-Of-Sale (POS) computer system to:
    open a sales transaction;
    in response to opening the sales transaction, collect receipt data for the sales transaction;
    access a customer fingerprint associated with sales transaction;
    poll a receipt preferences database server for receipt delivery preferences, the poll including the customer fingerprint, the receipt preferences database server connected to a receipt preferences database storing user specified receipt delivery preferences for a plurality of different mobile device users;
    receive receipt delivery preferences applicable to the sales transaction from the receipt database server, the received receipt delivery preferences previously specified through a mobile device by a user of the mobile device, the received receipt delivery preferences including a printed receipt preference that indicates when a paper receipt is to be provided along with a digital receipt for the sales transaction;
    close the sales transaction; and
    in response to closing the sales transaction, output one or more types of receipts for the sales transaction in accordance with the printed receipt preference, including one or more of:
      send a digital receipt containing the collected receipt data to a device associated with the customer fingerprint; and
      print a paper receipt containing the collected receipt data in accordance with the printed receipt preference.

8. The system of claim 7, further comprising:
a mobile device, the mobile device comprising:
  one or more processors;
  system memory;
  a user interface for receiving input from a user;
  a communication module for communicating with the receipt preferences database server; and
  one or more computer storage media having stored thereon computer-executable instructions that, when executed, cause the mobile device to:
    receive user input specifying receipt delivery preferences that apply to sales transactions conducted with the entity; and
    send the specified receipt delivery preferences and a customer fingerprint through the communication module to the receipt preferences database server.

9. The system of claim 8, further comprising computer-executable instructions that, when executed, cause the mobile device to, prior to sending the specified receipt delivery preferences and a customer fingerprint, derive the customer fingerprint from one of: a loyalty number, a telephone number, or a portion of a credit card number.

10. The system of claim 7, wherein computer-executable instructions that, when executed, cause the Point-Of-Sale (POS) computer system to print a paper receipt comprise computer-executable instructions that, when executed, cause the Point-Of-Sale (POS) computer system to print a paper receipt in accordance with a printed receipt preference that specifies paper receipts are to be printed for all of the customer's sales transactions.

11. The system of claim 7, wherein computer-executable instructions that, when executed, cause the Point-Of-Sale (POS) computer system to print a paper receipt comprise computer-executable instructions that, when executed, cause the Point-Of-Sale (POS) computer system to print a paper receipt in accordance with a printed receipt preference that specifies a paper receipt is to be printed for the sales transactions.

12. The system of claim 7, wherein computer-executable instructions that, when executed, cause the Point-Of-Sale (POS) computer system to output one or more types of receipts for the sales transaction consist of computer-executable instructions that, when executed, cause the Point-Of-Sale (POS) computer system to send a digital receipt to the mobile device.

13. A computer program product for use at a receipt preferences database server for an entity, the receipt preferences database server connected to one or more Point-Of-Sale (POS) systems at each of one or more store locations for the entity, the receipt preferences database server configured to manage a receipt preferences database for the entity, the computer program product for implementing a method for delivering customer specified receipt types at checkout, the computer program product comprising one or more computer storage devices having stored thereon computer-executable instructions that, when executed at a processor, cause the receipt preferences database server to perform the method, including the following:

receive customer specified receipt delivery preferences and a customer fingerprint from a mobile device, the customer specified receipt delivery preferences specified through the mobile device by a customer of the entity, the customer specified receipt delivery preferences including a printed receipt preference for the one or more store locations, the printed receipt preference indicating when a customer desires printed receipts to be provided along with digital receipts for sales transactions;

store an association between the customer fingerprint and the customer specified receipt delivery preferences in the receipt preferences database, the receipt preferences database storing customer specified receipt delivery preferences for a plurality of different customers, including the customer;

subsequent to storing the association between the customer fingerprint and the customer specified receipt delivery preferences, receive a poll for receipt delivery preferences applicable to a sales transaction at a store location, the store location included in the one or more store locations, the poll including the customer fingerprint;

use the customer fingerprint to identify the customer specified receipt delivery preferences, including the printed receipt preference, from within the receipt preferences database; and return the customer specified receipt delivery preferences, including the printer receipt preference, to the store location for use in determining if a paper receipt is to be provided along with a digital receipt for the sales transaction.

14. The computer program product of claim 1, wherein computer-executable instructions that, when executed, cause the receipt preferences database server to receive customer specified receipt delivery preferences and a customer fingerprint from a mobile device comprise computer-executable instructions that, when executed, cause the receipt preferences database server to receive a customer fingerprint that was derived at the mobile device from one of: a loyalty number, a telephone number, or a portion of a credit card number.

15. The computer program product of claim 1, wherein computer-executable instructions that, when executed, cause the receipt preferences database server to receive customer specified receipt delivery preferences and a customer fingerprint from a mobile device comprise computer-executable instructions that, when executed at a processor, cause the receipt preferences database server to receive customer specified receipt delivery preferences including a printed receipt preference that specifies paper receipts are to be printed for the customer.

16. The computer program product of claim 1, wherein computer-executable instructions that, when executed, cause the receipt preferences database server to receive a poll for receipt delivery preferences applicable to a sales transaction comprise computer-executable instructions that, when executed, cause the receipt preferences database server to receive a poll including the customer fingerprint, the customer fingerprint derived at a Point-Of-Sale (POS) computer system from one of: a loyalty number, a telephone number, or a portion of a credit card number.

17. The computer program product of claim 1, wherein computer-executable instructions that, when executed, cause the receipt preferences database server to return the customer specified receipt delivery preferences to the store location comprise computer-executable instructions that, when executed, cause the receipt preferences database server to return customer specified receipt delivery preferences, including a printed receipt preference that specifies paper receipts are to be printed for the sales transaction.

18. The computer program product of claim 1, wherein computer-executable instructions that, when executed, cause the receipt preferences database server to return the customer specified receipt delivery preferences to the store location comprise computer-executable instructions that, when executed, cause the receipt preferences database server to return customer specified receipt delivery preferences, including a printed receipt preference that specifies paper receipts are not to be printed for the sales transaction.

\* \* \* \* \*

UNITED STATES PATENT AND TRADEMARK OFFICE
CERTIFICATE OF CORRECTION

| | | |
|---|---|---|
| PATENT NO. | : 8,700,474 B2 | Page 1 of 1 |
| APPLICATION NO. | : 13/595889 | |
| DATED | : April 15, 2014 | |
| INVENTOR(S) | : Stuart Argue et al. | |

It is certified that error appears in the above-identified patent and that said Letters Patent is hereby corrected as shown below:

On the Title Page, Item (54) and in the Specification, Column 1, Line 1, please correct the title:
~~DELIVERYING~~ DELIVERING CUSTOMER SPECIFIED RECEIPT TYPES AT CHECKOUT Signed and Sealed this
Twenty-fourth Day of June, 2014

Michelle K. Lee
*Deputy Director of the United States Patent and Trademark Office*